United States Patent [19]

Skoog

[11] Patent Number: 4,697,276
[45] Date of Patent: Sep. 29, 1987

[54] APPARATUS FOR SYNCHRONIZING PULSE TRAINS IN A DIGITAL TELEPHONE SYSTEM

[75] Inventor: Karl I. L. Skoog, Farsta, Sweden

[73] Assignee: Telefonaktiebolaget LM Ericsson, Stockholm, Sweden

[21] Appl. No.: 777,695

[22] PCT Filed: Jan. 11, 1985

[86] PCT No.: PCT/SE85/00010
§ 371 Date: Sep. 10, 1985
§ 102(e) Date: Sep. 10, 1985

[87] PCT Pub. No.: WO85/03181
PCT Pub. Date: Jul. 18, 1985

[30] Foreign Application Priority Data

Jan. 13, 1984 [SE] Sweden .............. 8400170-0

[51] Int. Cl.$^4$ .............................. H04L 7/00
[52] U.S. Cl. .................... 375/114; 375/116; 370/100
[58] Field of Search .......... 375/106, 113, 114, 116, 375/76; 370/100, 101, 106; 371/42, 46; 328/63; 307/528

[56] References Cited

U.S. PATENT DOCUMENTS

| 3,309,463 | 3/1967 | Roedl | 375/114 |
|---|---|---|---|
| 3,777,066 | 12/1973 | Nicholas | 375/114 |
| 4,125,812 | 11/1978 | Polonio | 375/76 |
| 4,239,934 | 12/1980 | Andren et al. | 375/56 |
| 4,242,755 | 12/1980 | Gauzen | 375/116 |
| 4,404,675 | 9/1983 | Karchevski | 375/116 |
| 4,419,699 | 12/1983 | Christopher et al. | 375/114 |
| 4,443,883 | 4/1984 | Berger | 375/116 |
| 4,512,026 | 4/1985 | VanderMeiden | 375/114 |
| 4,594,708 | 6/1986 | Servel et al. | 370/100 |

Primary Examiner—Robert L. Griffin
Assistant Examiner—Stephen Chin
Attorney, Agent, or Firm—Roberts, Spiecens & Cohen

[57] ABSTRACT

A system which includes an exchange (EX) to which are connected a plurality of telephone sets (TA). The exchange contains a central processor (EXCP), a plurality of line boards, each of which contains a plurality of line circuits (DEC) for interfacing between the exchange and the connected telephone sets. Each telephone set contains a line circuit (DIC) in which there are included a coder and decoder for PCM-coded information words. The system is completely digitized and transfers digital information in time-divided form between the telephone sets. For achieving accurate synchronization of the pulse trains between the different units while simultaneously reducing jitter, the unit (DIC) is equipped with a counter ($CTP_T$) which under control of a signal from a comparison circuit (CO) is reset to zero at given times, thereafter starting counting once again with synchronizing signals defining a synchronizing window being sent via a line to a receiving unit (DIC) in a telephone set. The synchronizing window consists of a positive logical One signal and a negative logical One signal preceded by a given number of logical Zeros. The counters are reset to zero during the $-1$ pulse and the rapid derivative in the junction between positive and negative pulse in the synchronizing signal at the change is utilized to once again start the count.

9 Claims, 3 Drawing Figures

APPARATUS FOR SYNCHRONIZING PULSE TRAINS IN A DIGITAL TELEPHONE SYSTEM

FIELD OF INVENTION

The invention relates to an apparatus for synchronizing pulse trains in a digital telephone system.

BACKGROUND

In transmitting digital information over comparatively long distances and with high information speed, propagation time soon becomes of the same order of magnitude as or greater than the information time for an individual item of the information in question. The propagation time is limited by the speed of light, which in vacuum is about 300 m/µs. For example, the propagation time for a pair in a cable or in a quad conductor may attain 140 m/µs. Since the information time in communication systems using, for example, pulse code modulated (PCM) transmission to a telephone set, is in the order of magnitude of microseconds, and the line length may often be thousands of meters, the propagation times can easily attain the order of magnitude of tens of microseconds. Some form of synchronization must therefore be resorted to for ensuring reliable information reading.

An usual method is to get the synchronizing information from the information flow itself, e.g. by forming the information such that data, facilitating detection, can be retrieved from it.

Typical systems of the above type operate with the so-called "Manchester code" and its different implementation, where the digital information may be formed so that there is always a change in polarity, irrespective of whether the information is a logical One or a logical Zero. This change in polarity is detected and utilized for correcting the frequency in a phase locked loop (PLL) oscillator, for example. In modern transmission systems of the so-called "burst" type, information is sent, for example, in one direction for ⅓ of the time and in the other for a further ⅓, while the remaining ⅓ must be unutilized to compensate for the propagation times in the line.

The problems in systems utilizing the Manchester code include that an error is more or less assumed in the related self-correcting apparatus, an error voltage thus being generated with the intention of correcting the frequency, and that when the error is corrected the error voltage disappears and a new error occurs. The system thus affords a natural tendency for the frequency to oscillate about the correct one, and is therefore seldom exactly right. The digital information is furthermore affected by the characteristics of the line and the sequence of the logical Ones or Zeros, particularly the latter if the information is not continuous. These conditions result in that the detections will not be exact in time, but vary somewhat so that jitter occurs. This jitter must be kept within given limits if detection errors are not to occur.

The problem in utilizing the burst system is that apart from the synchronizing information being absent for ⅔ of the time, as previously mentioned, the start of the information packet must be determined with great accuracy. The packet is thus characterized by a time period having no signal, after which the signals occur. Irrespective of whether the subsequent signals are DC-symmetric (alternating +Ones and −Ones) the first signals will be of different magnitudes and with a displacement in the zero passages. The first pulse in a pulse train starts with the line in the rest condition of 0 volts. On the other hand, the second pulse is affected by the residual voltage from the previous pulse. This means that each individual pulse is thus dependent on its antecedents.

SUMMARY OF INVENTION

It is an object of the invention to provide improved methods and apparatus enabling the synchronizing of pulse trains in, for example, digital telephone systems. In achieving the above and other of its objects, the present invention is characterized in that it solves the problems arising by methods and apparatus notifying of the start of a pulse train, giving a reliable indication irrespective of the antecedents of each individual pulse, minimizing jitter, and making indications independent of the number of pulses in a train.

To achieve the above and other objects of the invention, there is provided a method for synchronizing pulse trains in a digital telephone system, including an exchange and a plurality of telephone sets connected to the exchange via respective lines. The exchange includes a central processor and a plurality of line circuits, each of the telephone sets including a separate line circuit. Each of the line circuits mentioned above has a reception and a transmission direction and includes a primary counter, a time position counter, and a synchronizing detector which detects, in the reception direction of the line circuits, the reception of a synchronizing window containing at least two consecutive synchronizing bits of opposing polarity preceded by a plurality of logical Zeros.

The method comprises generating and transmitting to the synchronizing detector a synchronizing signal consisting of the aforesaid consecutive synchronizing bits or pulses of opposite polarity preceded by said plurality of logical Zeros. Thereafter, the method comprises transmitting during the duration of the first of the synchronizing bits a zero resetting sigal to the aforesaid primary counter, feeding a high frequency signal to the primary counter and in the primary counter dividing the high frequency signal down and sending a resulting control signal of lower frequency to the time position counter. The method also comprises sending the zero resetting signal also to the counter CTP and utilizing the change between the first and second synchronizing bits to cause the zero resetting of the counters to take place rapidly due to the steep derivatives of the transition between the synchronizing bits whereupon the counters resume counting in a precisely-defined manner enhancing synchronization.

The apparatus of the invention is as set forth above with the primary counter receiving a high frequency signal and dividing the same for transmitting the above-noted control signal of lower frequency to the time position counter.

Other objects, features and advantages of the invention will be found in the Detailed Description which follows hereinbelow.

BRIEF DESCRIPTION OF DRAWINGS

The apparatus according to the invention will next be disclosed in greater detail by reference to an embodiment illustrated in the accompanying drawing in which.

DETAILED DESCRIPTION

The system in which the apparatus of the invention is included is a digital telephone system including a central exchange EX in which there are included, inter alia, a central processor unit EXCP, a plurality of line boards each containing a plurality of line circuits DEC, for interfacing between the exchange and a plurality of telephone sets TA connected to it. Each telephone set contains in its turn a line circuit DIC, in which there are included, inter alia, a coder and decoder for PCM-coded information words. The system is completely digitized and transfers digital information in time-divided form between the telephone sets. For synchronizing the system, i.e. the present invention, there are utilized accurate high-frequency crystal oscillators, sync detectors and counters for dividing down the oscillator frequency. As an example of such a system may be mentioned a completely digital intercom system with both loudspeaking and lowspeaking (handset) function. In the telephone system illustrated in FIG. 1, information is transmitted in digital time-divided form between telephone sets TA and a central selector-free exchange EX. PCM is utilized for transmission between the exchange and telephone sets.

An exchange of the kind in question contains the central processor EXCP with associated data and program stores, a plurality of line boards L, each containing the plurality of line circuits DEC for connection to the telephone sets TA, each of the latter containing a line circuit DIC which has, inter alia, the task of coding and decoding the PCM information. The exchange further contains a plurality of speech control boards, each of which contains a plurality of speech control units. Each line board and speech control board further contains its own regional processor.

The control information between the central processor and the regional processors is transferred via a control bus common to the processors. The PCM-coded information (the speech) between the telephone sets is transferred within the exchange on a separate internal communication bus.

Figure 1:
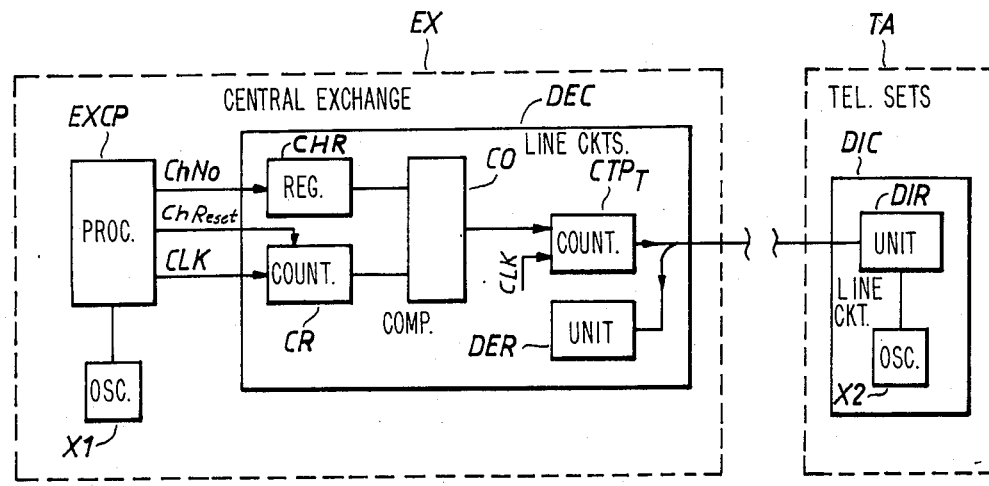
FIG. 1 illustrates a system utilizing apparatus provided in accordance with the invention.

Only the units in the system which are important for enabling clarification of the synchronizing process are depicted in FIG. 1. Central processor EXCP with associated high-frequency crystal oscillator X1 is connected in the exchange to a line circuit DEC. In the line circuit there are included, inter alia, a channel register CHR, a five-bit channel counter CR, a comparison circuit CO and a plurality of time slot counters for the send and receive directions of the line circuit. The line circuit DEC is connected via two-wire lines to the further line circuit DIC in a connected telephone set TA, the line circuit DIC also containing a time slot counter and a high-frequency crystal oscillator X2.

The central time division includes 32 channels, each of which includes two time slots. The time slots of the different channels are not bound to each other or to any function or unit, but may be utilized as required, e.g., for a speech connection. For loud speaker apparatus functions, two time slots are required for each apparatus, one for information to the apparatus and one for information from it. Four time slots are thus required for a complete loudspeaker connection. For handset ("receiver" lifted) communication, two time slots are sufficient, one for each speed direction.

One of the central (common) time slots is arranged for sending a tone signal, another for worktime music, for example. The digital transfer takes place with the aid of the previously mentioned burst signalling, i.e. the digital signals to and from a telephone set are sent in groups, or bursts, at different times separated by pauses.

A complete transfer of this kind, including pauses, takes place 16,000 times per second, which gives a time frame of 62.5 μs (micro seconds) and a frequency range up to 8000 Hz at most. The sequence starts from the exchange side by the line unit's sending two synchronizing bits which are accompanied by a PCM sample for speech and two data bits. By means of the synchronizing bits, the telephone set sorts out the PCM sample and data bits, and acknowledges by sending the corresponding information, i.e. synchronizing bits, PCM sample and data bits, back to the exchange.

Signalling in accordance with the invention is illustrated with the aid of the type of signalling called "ternary", i.e. one where three different information conditions can be present, namely positive pulses (+1), negative pulses (−1) or no pulse (0). Zeros in a pulse train are indicated here as no pulse (0) and Ones are sent as alternatingly +1 or −1. In this type of signalling, the pulse train can accordingly obtain a very varying appearance, thus making the greatest demands on synchronizing and detection. 16 kHz (64 μs) has been selected as the repetition frequency, with 32 time positions (pulse width 2 μs) and with a maximum of 10 Ones in the pulse train.

Figure 2:
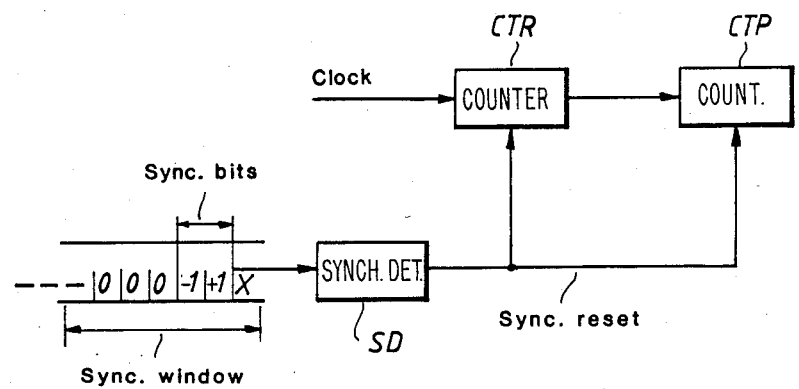
FIG. 2 illustrates an apparatus for detecting the starting time for a pulse train and for minimizing jitter.

A time position counter CTP is illustrated in FIG. 2 and, according to the example this is a 5-bit counter with the ability of giving 32 different time positions TP. The counter is driven by a signal with the frequency 512 kHz. The driving frequency is generated by oscillator X1, the output signal of which has a considerably higher frequency, which is 8 times greater, i.e. 4,096 MHz, according to the example. The oscillator drives a 3-bit primary counter CTR which divides the oscillator frequency by 8 to obtain the mentioned driving frequency to the time position counter CTP.

In FIGS. 1 and 2 there is illustrated the principle of synchronizing a unit DIC (the line circuit in the apparatus) at a considerable distance from a second unit DEC (the line circuit in the exchange) and also synchronization of the two units DEC and EXCP situated close to each other. As previously mentioned, the two latter units constitute the line circuit in the exchange and the central processor. The start of a pulse train is characterized by two synchronizing pulses, which are −1 and +1 according to the example, preceded by a plurality of Zeros, forming a so-called sync window. A synchronizing detector SD receives the sync window and notes the change from −1 to +1 in the sync signal. Definite advantages are obtained by utilizing two sync pulses. The first sync pulse is used to give the line a definite starting value for the beginning of the second pulse and the second sync pulse is used to give the most rapid possible derivative to the junction between the pulses. By utilizing the rapid derivative, the junction between −1 and +1 can be accurately determined. During the duration of the −1 pulse the sync detector SD resets both counters CTR and CTP to zero, the zero resetting ceasing on the change and the counters can begin to count. The primary counter has 8 positions (0–7) and any one of these can be used for driving the time position counter CTP. In the example it is assumed that position 1 is used. Since there is no synchronism, the 1-position may occur immediately, or up to 0.25 μs after the clock pulse start, which results in jitter. Under the given conditions, this jitter can attain a maximum of 0.25 μs. By the facility of selecting between 8 different positions for driving the time position counter CTP, the influence of the lines on the sync pulses can be taken into consideration so that the counter CTP can be stopped in time in the most advantageous way for the subsequent pulses. Up to 8 different strobe pulses may be selected from the primary counter CTR. Since these are only separated by 0.25 μs, consideration can also be given to the internal time delay in the circuits.

Two units EXCP and DEC are illustrated in FIG. 1 and are assumed to lie so close to each other that the propagation delay for a signal sent from the unit EXCP until it is received in the unit DEC and vice versa may be regarded as zero. FIG. 1 further illustrates the unit DIC in a telephone set, this unit being connected to the other units by a line, and at a distance from them corresponding to a delay of 6 μs. The adjacent units EXCP and DEC are controlled by the same clock signals, represented as channel clock and channel "0" Ch Reset. The clock CLK signals are generated in the central processor unit EXCP with the aid of the crystal oscillator X1.

The system according to the example includes 32 channels, and in what channel unit DEC shall operate is registered in a channel register CHR by the processor EXCP writing in an idle channel number determined by the processor into the register. With the aid of the channel register CHR and a 5-bit channel counter CR, controlled by the central clock and the channel "0" RESET pulse, a zeroreset pulse (DEC transmit counter reset) is conventionally generated in a comparator CO for resetting to zero the time position counter $CTP_T$ in the line circuit DEC. A pulse burst is sent from the counter $CTP_T$ via a long line to the line circuit DIC, which in turn is provided with a unit DIR containing a synchronizing detector SD and a crystal oscillator-controlled counter means CTP/CTR of the same type and function as described for FIG. 2. The crystal oscillator X2 in the unit DIC is of the same type and frequency as the crystal oscillator X1 in the unit EXCP. The unit DIC returns a pulse train (a burst) to the unit DEC, a unit DER being activated and functioning as described in connection with FIG. 2, this unit containing a further 32-position time position counter $CTP_R$, a primary counter CTR and a synchronizing detector SD (see FIG. 2).

In accordance with FIG. 1, the central processor EXCP time-divides the channels T0-T31, and the processor considers the start of channel 0 as system time 0 (zero). The processor assigns to the connected line circuit DEC a channel number which states in what channel the circuit DEC will operate. The processor performs this by writing the selected channel number into the channel register CHR in the circuit DEC. For example, DEC is assigned the channel number 14, which means that the circuit DEC operates towards the processor EXCP in channel number 14. The start time for DEC in this case is T14. Another circuit DEC, controlled by the same processor, can operate towards the processor in channel number 20, for example, thus obtaining the start time T20, as envisaged from the processor.

A processor EXCP itself operates with 32 channels, according to the example, and towards a plurality of line circuits DEC. Each circuit DEC generates its own 32 time positions TP0-TP31 towards the telephone set. Thus, for separating the concepts channels (EXCP-DEC) and time positions (DEC-DIC), the abbreviation TP stands for time position. The circuit DIC is the line circuit in the telephone set, as previously mentioned. The circuit DEC considers the start time T14 (T20) as its own start time TP0 (zero) towards the telephone set.

According to FIG. 1, channel 14 is registered in channel register CHR. When the processor's EXCP time slot counter has counted to channel 0, a zero resetting signal is sent to the counter CR in the line circuit DEC. The counter is reset to zero and begins a new count under the control of the clock signals, as previously mentioned. The signals from the channel register and the counter CR are compared in the comparison circuit CO and, when agreement is present, a signal is sent to the time position counter $CTP_T$. A pulse train (burst) is then sent from the line circuit DEC through the line to the line circuit DIC in the connected telephone set. As mentioned, the pulse train consists of two sync Ones accompanied by PCM information and data bits. Due to the propagation time, caused by varying line length, the pulse train arrives at different times.

Figure 3:
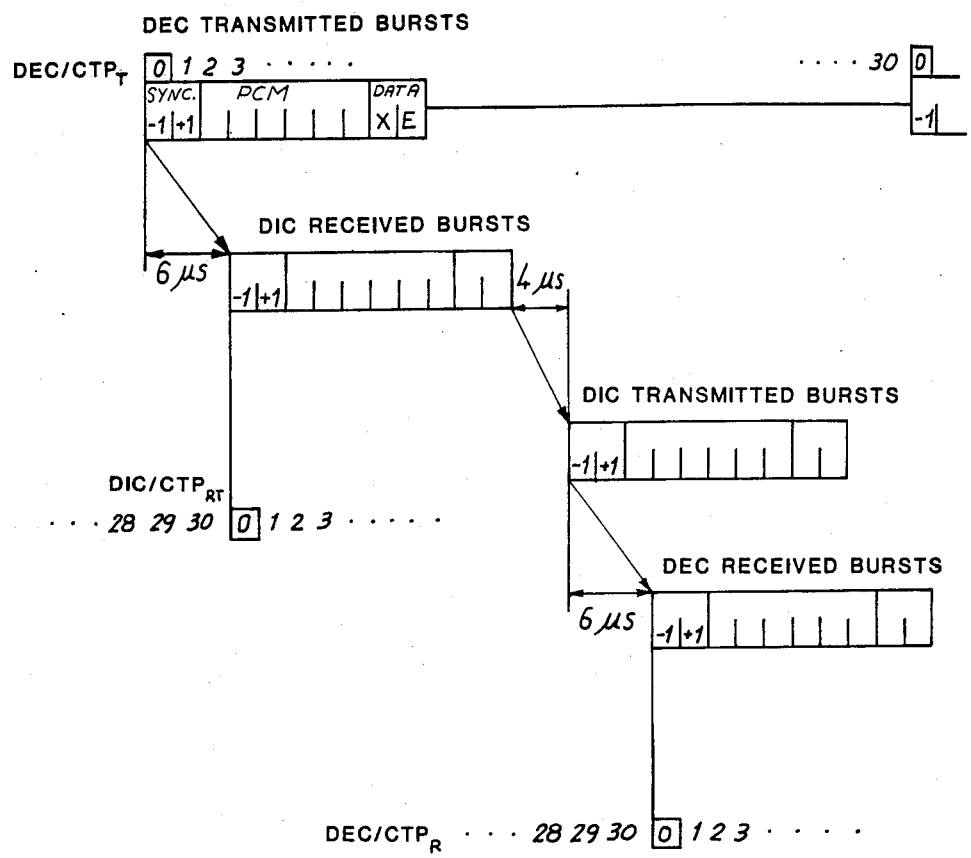
FIG. 3 illustrates the time delay for a pulse train at certain definite points in the system, and for a line length of about 850 m (6 μs).

The time relationship for sending and receiving in the system is illustrated in FIG. 3 for an assumed time delay between DEC and DIC of 6 μs. As mentioned, both line circuits DEC and DIC contain equipment according to FIG. 2 for the synchronization.

FIG. 3 illustrates how the line circuit DEC sends a pulse train which is received 6 μs later in the line circuit DIC. There is subequently an interval of 4 μs (2 time positions) for separating termination of reception in DIC and start of sending from DIC. After this interval, the circuit DIC sends a pulse train in return to the circuit DEC, which receives the train a further 6 μs later.

As described, a new start time TP0 is generated in the circuit DEC on sending towards the line. The line circuit DIC utilizes the polarity change between the sync Ones as sync indication for its own start time TP1 (the telephone set start time) and subsequently sends back again to the circuit DEC. On reception in the circuit DEC, a further start time TP2 is generated, since the pulse train has then passed once again through the line. In generating new start times, the corresponding counter is set to zero and, in accordance with what has been described for FIG. 2, the desired synchronization and reduction of jitter is obtained. The apparatus in accordance with the invention thus gives in a simple way rapid and reliable synchronization, by a plurality of counters being separately reset to zero for each pulse train (burst), and for reducing jitter the counters for received pulse train (bursts) in the circuits DIC and DEC are driven at substantially higher frequency than what corresponds to the frequency for division into time slots.

What is claimed is:

1. A method for synchronizing pulse trains in a digital telephone system including an exchange (EX) and a plurality of telephone sets (TA) connected to the exchange via lines, the exchange including a central processor (EXCP) and a plurality of line circuits (DEC), each of the telephone sets including a separate line circuit (DIC), each of said line circuits (DEC) and (DIC) having reception and transmission directions and including a primary counter, a time position counter, and a synchronizing detector (SD) which detects, in the reception direction of the line circuits, the reception of a synchronizing window containing at least two consecutive synchronizing bits of opposing polarity preceded by a plurality of logical Zeros, said method comprising generating and transmitting to the synchronizing detector a synchronizing signal consisting of said consecutive synchronizing bits of opposite polarity preceded by said plurality of logical Zeros, transmitting during the duration of the first of the synchronizing bits a zero resetting signal to said primary counter (CTR), feeding a high frequency signal to the primary counter and in the primary counter dividing the high frequency signal down and sending a resulting control signal of lower frequency to the time position counter (CTP), sending the zero resetting signal also to said counter (CTP), and utilizing the change between said first and said second synchronizing bits to cause the zero resetting of the counters (CTR) and (CTP) to take place rapidly due to the steep derivative of the transition between the synchronizing bits, whereupon the counters resume counting in a precisely defined manner enhancing synchronization.

2. A method as claimed in claim 1, wherein said consecutive synchronizing bits comprise a positive logical One signal and a negative logical One signal.

3. Method as claimed in claim 1, wherein the utilization of said high frequency is such that the jitter on polarity change in the pulse train is kept below 0.25 $\mu s$ (microseconds).

4. Apparatus for synchronizing pulse trains in a digital telephone system, said apparatus comprising lines, an exchange (EX), and a plurality of telephone sets (TA) connected to the exchange via said lines, the exchange including a central processor (EXCP) and a plurality of line circuits (DEC), each of the telepone sets including a separate line circuit (DIC), each of said line circuits (DEC) and (DIC) having reception and transmission directions and comprising a primary counter means (CTR), a time position counter means (CTP), and a synchronizing detector means (SD) which detects, in the reception direction of the line circuits, the reception of a synchronizing window containing at least two consecutive synchronizing bits of opposing polarity preceded by a plurality of logical Zeros, during the duration of the first of said synchronizing bits there being a zero resetting signal sent by said synchronizing detector means to said primary counter (CTR), said primary counter receiving a high frequency signal and dividing the same for transmitting a control signal of lower frequency to said time position counter (CTP), there also being sent by said synchronizing detector means a zero resetting signal to said counter (CTP), said line circuits further including means whereby on the change between said first and said second synchronizing bits the zero resetting of the counters (CTR) and (CTP) rapidly ceasing due to the steep derivative of the voltage change between the synchronizing bits, whereon the counters once again begin to step.

5. Apparatus as claimed in claim 1, wherein the synchronizing detector means includes means whereby said consecutive synchronizing bits comprise a positive logical One signal and a negative logical One signal.

6. Apparatus as claimed in claim 4 wherein said line circuits of said telephone sets include coder and decoder means for PCM coded information words.

7. Apparatus as claimed in claim 6 wherein the first said line circuits (DEC) interface between said exchange and said telephone sets.

8. Apparatus as claimed in claim 7 comprising means for transferring digital information in time-divided form between said telephone sets.

9. Apparatus as claimed in claim 8 wherein the first said line circuits comprise comparator means for resetting said time position counter means whereby the next sequential synchronizing signal including said synchronizing bits is transmitted to the line circuit of one of said sets.

* * * * *